United States Patent [19]
Chandross et al.

[11] Patent Number: 6,002,823
[45] Date of Patent: Dec. 14, 1999

[54] TUNABLE DIRECTIONAL OPTICAL WAVEGUIDE COUPLERS

[75] Inventors: Edwin Arthur Chandross, Murray Hill, N.J.; Arturo Hale, New York, N.Y.; Valerie Jeanne Kuck, Upper Montclair, N.J.; Edward John Laskowski, Scotch Plains, N.J.; Christi Kay Madsen, South Plainfield, N.J.; Ronald Edward Scotti, White House Station, N.J.; Joseph Shmulovich, Murray Hill, N.J.

[73] Assignee: Lucent Techolonogies Inc., Murray Hill, N.J.

[21] Appl. No.: 09/129,522

[22] Filed: Aug. 5, 1998

[51] Int. Cl.[6] ....................................... G02B 6/26
[52] U.S. Cl. ............................. 385/50; 385/129
[58] Field of Search ................... 385/50, 24, 42, 385/15, 129–132, 39, 31, 27

[56] References Cited

U.S. PATENT DOCUMENTS

| 3,880,630 | 4/1975 | Izawa | 385/129 |
| 5,170,451 | 12/1992 | Ohshima | 385/43 |
| 5,796,885 | 8/1998 | Gonthier et al. | 385/15 |
| 5,875,272 | 2/1999 | Kewitsch et al. | 385/37 |

*Primary Examiner*—Akm E. Ullah

[57] ABSTRACT

The thermo-optically controlled optical couplers wherein the coupling region between the waveguides in the coupling section is filled with a material having a high dependence of refractive index on temperature thus making the thermo-optic control means more efficient and allowing a greater range of adjustment in the coupling coefficient for a given temperature change.

12 Claims, 7 Drawing Sheets

TUNABLE DIRECTIONAL OPTICAL WAVEGUIDE COUPLERS

FIELD OF THE INVENTION

This invention relates to optical couplers that can be tuned by thermo-optic control.

BACKGROUND OF THE INVENTION

Directional optical couplers are key elements in planar lightguide circuits (PLCs). For example, directional couplers with coupling ratios which vary from zero to one are required for Fourier filters and ring filters, and directional couplers having a 50% power splitting ratio are needed in Mach-Zehnder Interferometers (MZI). Couplers are widely used in optical transmission systems.

In many of these applications, the coupling ratios in the coupler as fabricated must be very close to the design values so that the filter has the desired spectral response. An important evolution for silica based PLCs is for more compact devices, which require a higher refractive index difference ($\Delta$) between the core and cladding. A disadvantage of using high $\Delta$ is that the fabrication variations on the coupling ratio increase. Typically, fabrication tolerances cause variations in the coupling ratios of ±5% for 3 dB couplers in silica with low $\Delta$s ($\leq 0.7\%$). A method for actively tuning the coupling ratios after fabrication would be beneficial by: 1) increasing device yield, and 2) providing additional functionality by allowing the coupling ratio to be chosen from a large range of coupling values after fabrication of the coupler. Silica waveguides offer low loss, but the only post-fabrication technique to actively tune the PLC is to use thermal heaters and rely on the thermal dependence of the refractive index (dn/dT). Heaters can be deposited on the surface of the waveguide and used to tune the coupling ratio. This technique can be used also to tune the phase in a MZI. See e.g. B. Zheng and C. Zheng, "A study of directional coupler modulator with thermo-controlled coupling coefficient, Integrated Optoelectronics, Beijing, China: SPIE Vol. 2891, 1996, pp. 178–182. However, the refractive index of silica is relatively insensitive to temperature, thus requiring a substantial temperature change to effect the desired adjustment. This requires both higher power and longer heating times. A tunable coupler with more sensitive and more rapid thermal response would represent a significant advance in the art.

SUMMARY OF THE INVENTION

We have developed a tunable coupler with improved tuning sensitivity and response. Tunable couplers of the invention use a material with a large dn/dT as the cladding between waveguides in the tuning section of the coupler. The materials are polymers which have dn/dT in the range $-0.3 \times 10^{-4}$ to $-5 \times 10^{-4}$ per °C. We have also developed techniques for making these structures.

DETAILED DESCRIPTION

Figure 1:
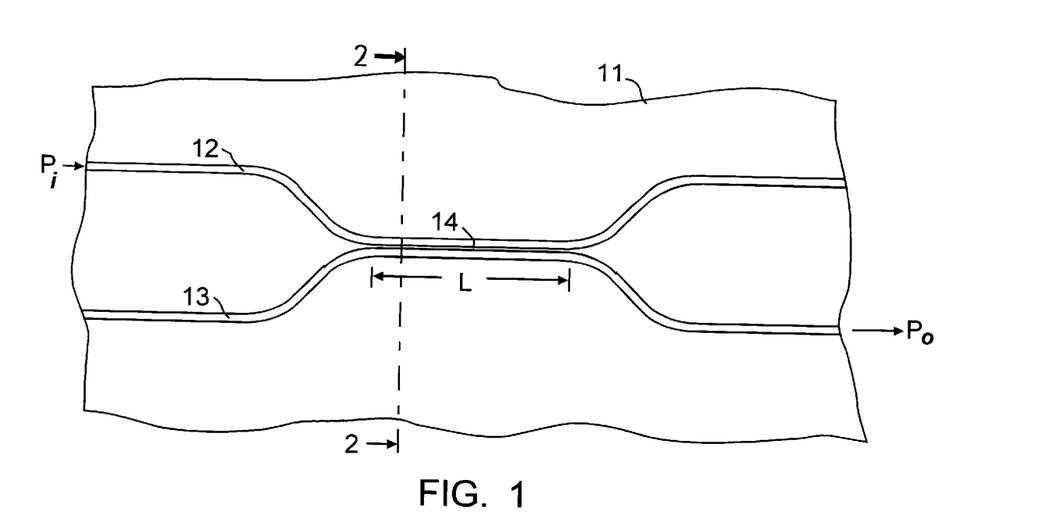
FIG. 1 is a plan view of a portion of a PLC showing the basic structure of a directional coupler.

With reference to FIG. 1, the substrate for the PLC is shown at 11. The substrate may be glass or other suitable rigid support. The preferred substrate material is silicon which is used in so-called optical bench technology for high quality optical integrated circuits. The technology used in processing state of the art PLCs follows, in some respects, silicon IC wafer fabrication. With reference again to FIG. 1, two waveguides are shown at 12 and 13, with a coupling section where the waveguides run parallel and closely spaced to one another. The length of the coupling section is designated L. The coupling region, i.e. the space between the waveguides along the coupling section, is designated 14 in the figures.

The basic operation of a directional coupler is well known. It splits lightwaves coherently in a manner similar to a beam splitter in bulk optics. The input lightwave to waveguide 12 is $P_i$ and the output lightwave from waveguide 13 is $P_o$. When the waveguides are closely spaced, as in FIG. 1, the evanescent tail of the lightwave in waveguide 12 extends into waveguide 13 and induces an electric polarization. The polarization generates a lightwave in waveguide 13, which couples back to waveguide 12.

In the example given, the two waveguides are single mode and are parallel and identical in structure in the coupling region. Both waveguides bend away from each other at the ends as shown, and gradually decouple. The input lightwave $P_i$ and the output lightwave $P_o$ are related by:

$$P_i = k P_o$$

where k is the coupling ratio. The coupling ratio is strongly affected by the coupling region, and in particular by the core-to-cladding refractive index difference which is temperature dependent. This dependency can be utilized to adjust the coupling ratio after the fabrication of the waveguides has been completed.

Figure 2:
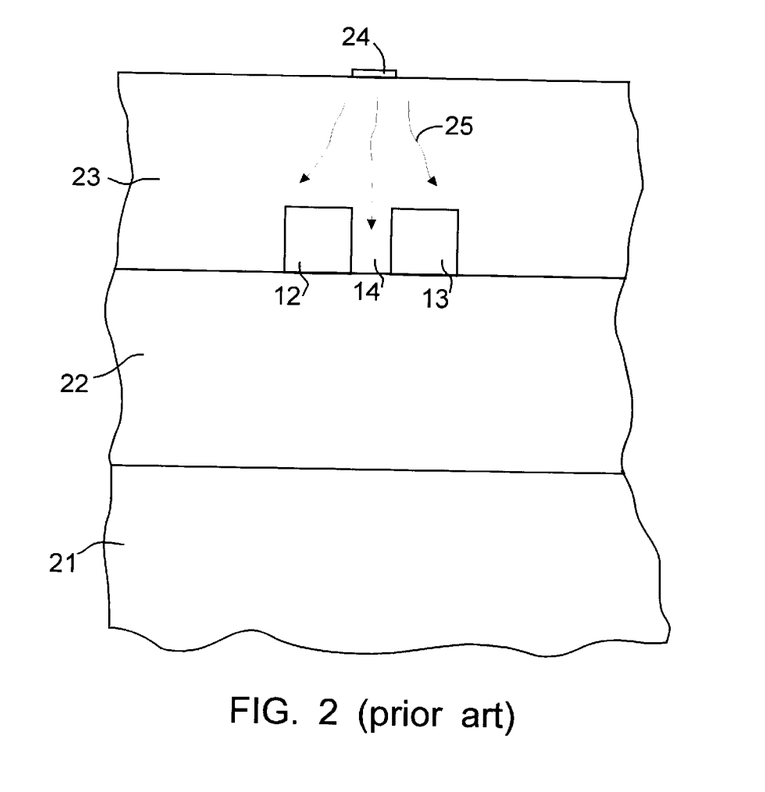

The basic structure for accommodating this thermo-optic control is shown in FIG. 2 which is a section through 2—2 of FIG. 1. In this view the silicon substrate 21, the lower cladding layer 22 and the upper cladding layer 23 can be seen. The waveguides are shown at 12 and 13, and are viewed in the coupling section where the waveguides are closely spaced. The coupling region is shown at 14. The thermal control means is shown at 24 and the heat transfer is represented schematically at 25. The control means is typically a resistive strip, such as chrome, or nickel chrome. Electrodes, not shown in this view, are typically gold or copper contact pads at the ends of the strip wire, and are connected to a power source.

Figure 3:
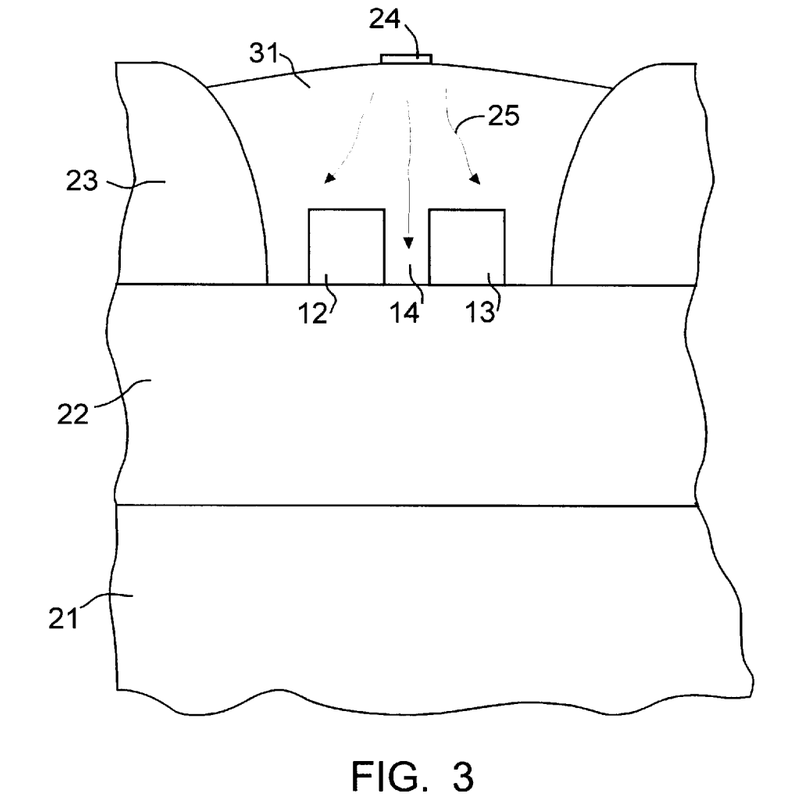
FIG. 3 is a sectional view similar to that of FIG. 2 showing the thermo-optic control means of the invention.

According to the invention, the silica region above and between the waveguides 12 and 13 is replaced by a polymer material which has a refractive index that is relatively more sensitive to temperature changes than conventional waveguide materials. This improvement is depicted schematically in FIG. 3, where the polymer material is shown at 31 covering the waveguides 12 and 13, and extending into the coupling region 14. The heating element is shown at 24 and the heat transfer is represented by arrows 25. The principal difference between this structure and the prior art structure of FIG. 2 is that the material in the coupling region 14 has a relatively high dependence of refractive index on temperature change. The cladding material in FIG. 2 is $SiO_2$, or a doped silica, with a temperature dependence of refractive index, dn/dT, of the order of $+10^{-5}$/°C. Polymers have dn/dT that is consistently in the range $-0.5 \times 10^{-4}$/°C. to $-4 \times 10^{-4}$/° C. Consequently, a much larger change in the effective index is possible for the same change in temperature.

The following specific procedure is given by way of one example of how to practice the invention. It will be understood by those skilled in the art that a variety of variations can be used to achieve equivalent results. The process steps will be described in conjunction with FIGS. 4–14.

Figure 4:
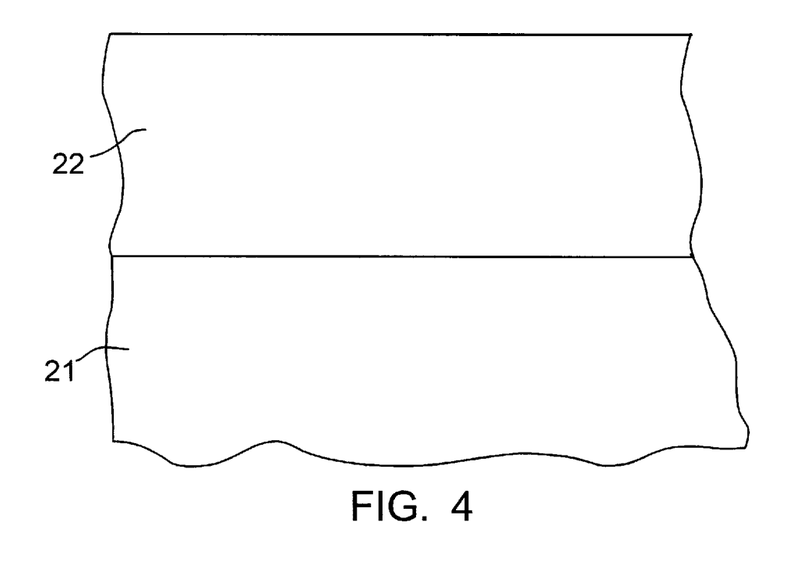
FIGS. 4–14 are schematic representations of a sequence of fabrication steps for the manufacture of the device of the invention.
Figure 5:
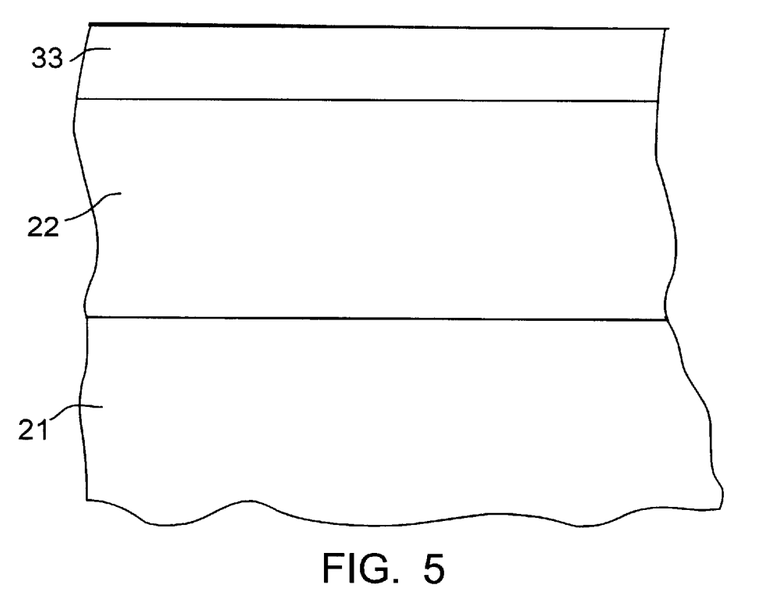

With reference to FIG. 4, a 15 µm oxide layer 22 is grown on a 5" silicon wafer 21 by high pressure oxidation to form the lower cladding layer for the waveguides. As shown in FIG. 5, the core layer 33 for the waveguides is deposited over lower cladding layer 22 by CVD deposition of doped $SiO_2$ using established CVD techniques. Typical CVD deposition processes use precursors of silane or halogenated silane and hydrogen, with hydrides or halides of phosphorus or germanium for the doping material. The level of doping is such as to create an index difference between core layer 33 and cladding layer 22 of 0.3–1.5%. The thickness of the core layer in this example is approximately 5 µm. The manufacture of waveguides for PLCs adopts many of the techniques used in optical fiber technology that are well known and widely used. The specifics of the glass technology form no part of the invention.

Figure 6:
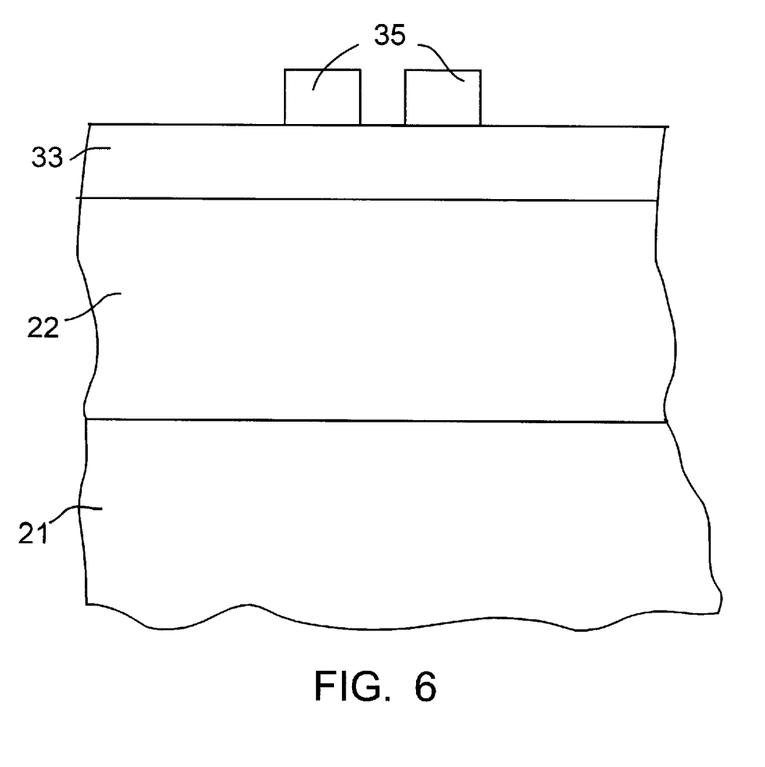
Figure 7:
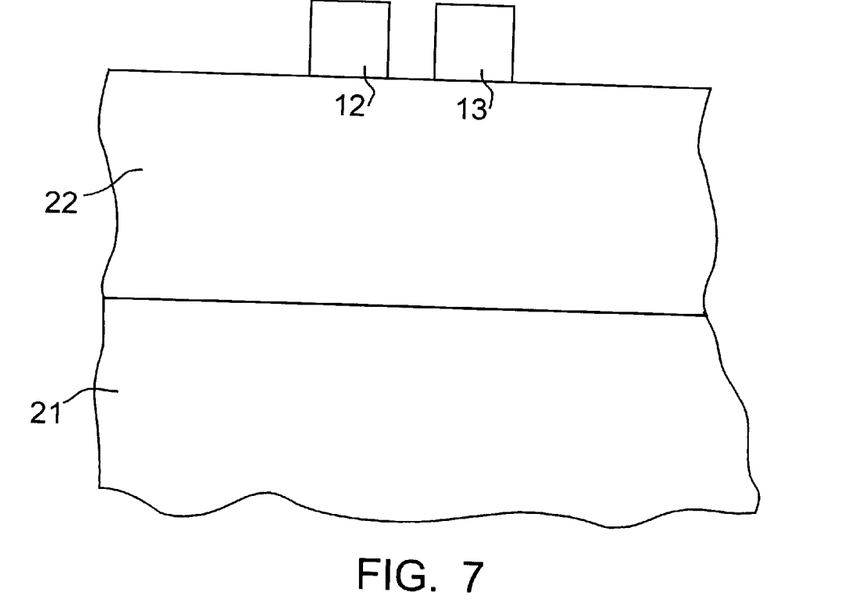

The waveguides are then defined by lithography. The feature sizes are relatively large, for example 5 µm waveguides with 3 µm spacing, so photolithography is generally suitable, although other lithography methods, e.g. methods using electron beam or x-ray actinic radiation, can also be used. A lithographic mask layer is applied over cladding layer 33 and patterned as shown in FIG. 6 to produce mask features 35 corresponding to the waveguides. The core layer 33 is then etched, using mask 35, to produce waveguides 12 and 13. The structure after etching, and after removal of the mask 35, is shown in FIG. 7. The etching technique is preferably Reactive Ion Etching (RIE) which will etch through a relatively thick silica layer without excessive undercut and produce relatively steep sidewalls. The sidewalls shown in these figures, which are not necessarily to scale, are shown as vertical for simplicity.

Figure 8:
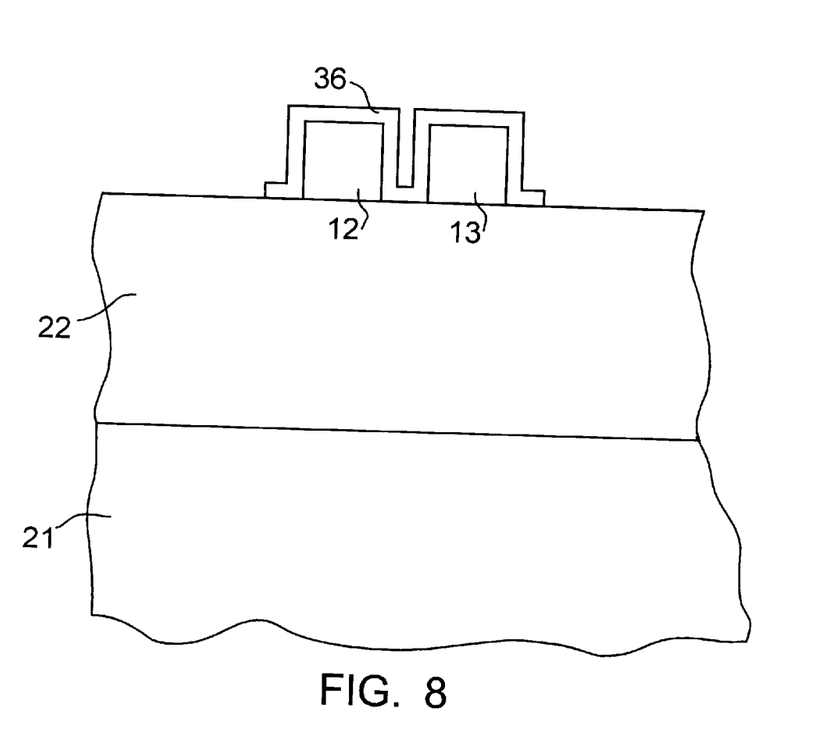

The next step, shown in FIG. 8, is to apply etch stop layer 36 to the waveguides 12 and 13 as shown. The etch stop layer can be any suitable material with a useful etch selectivity relative to the upper cladding layer. The preferred technique, again patterned after widely used silicon technology, is to use a polysilicon layer. The polysilicon layer is blanket deposited using CVD and the waveguides are masked. The polysilicon layer is etched using RIE, plasma, or any suitable process to form the etch stop 36, around the waveguides as shown in FIG. 8. The thickness of the etch stop may be in the range 0.5–2.0 µm.

Figure 9:
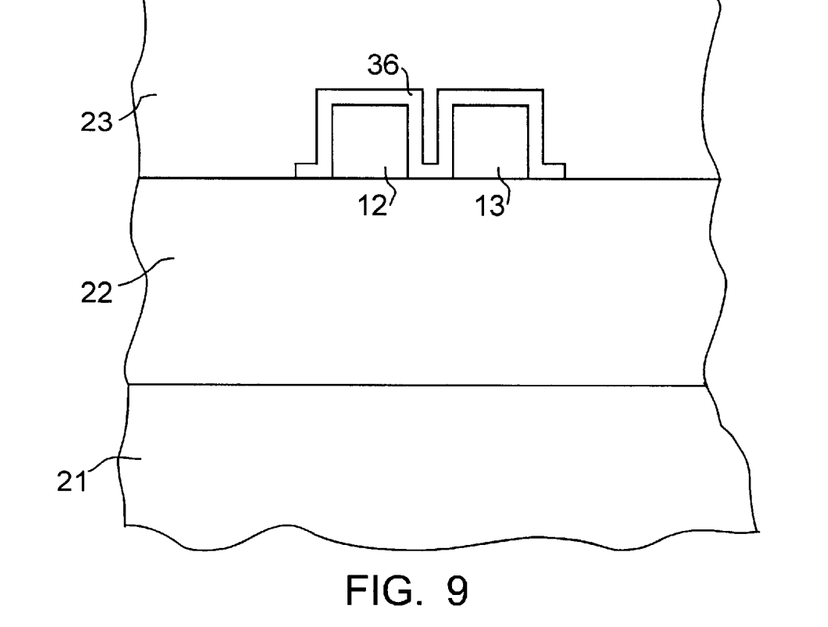
Figure 10:
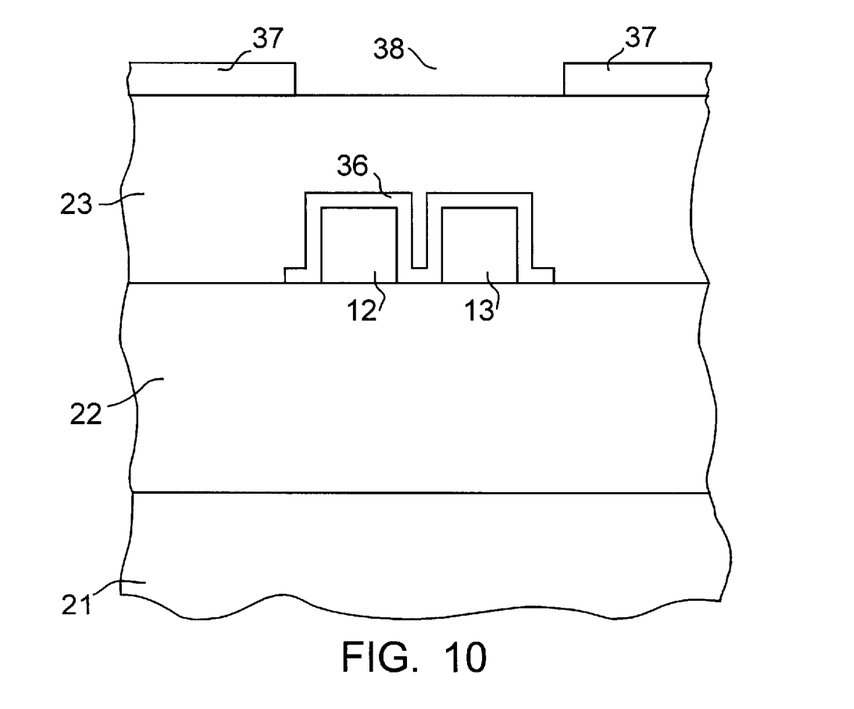
Figure 11:
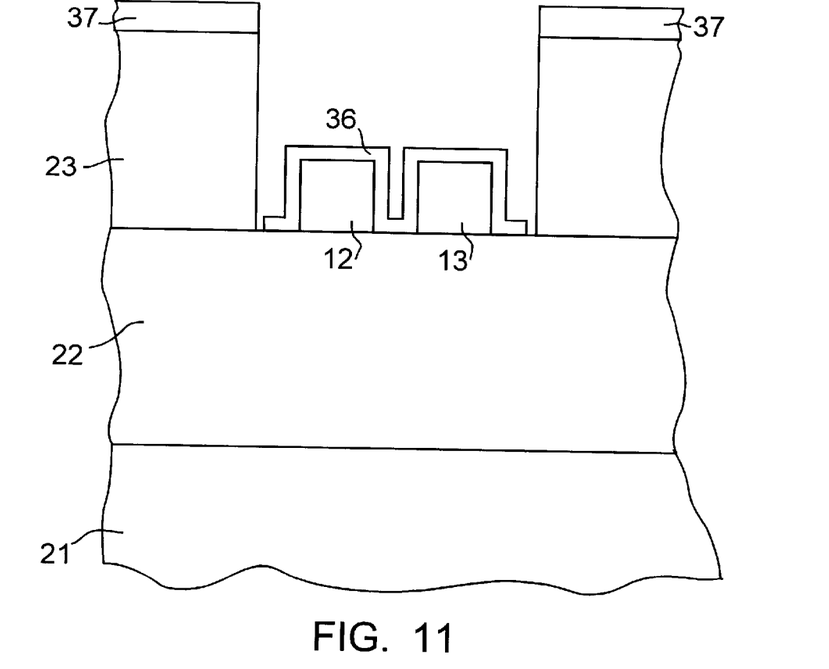
Figure 12:
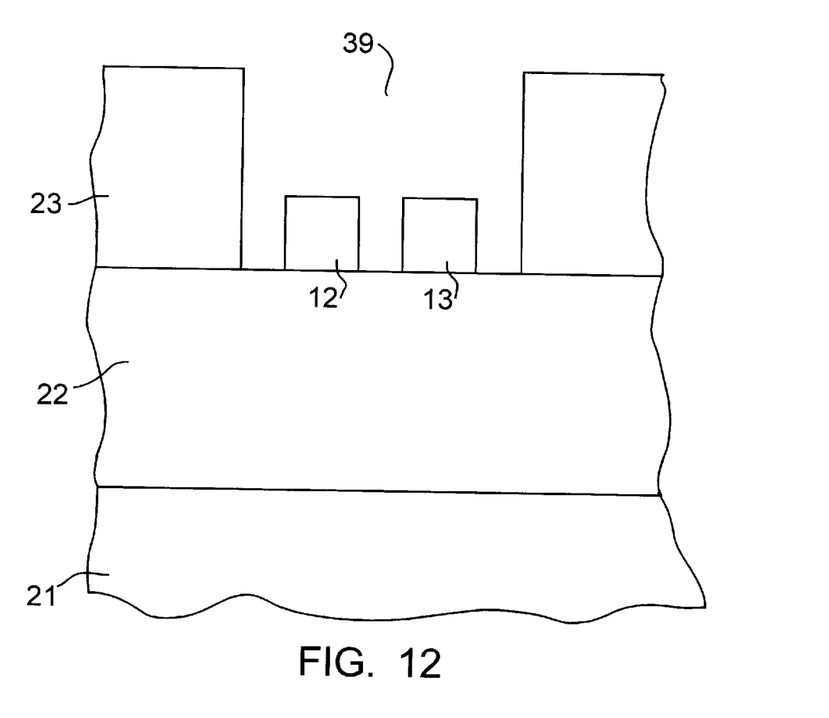
Figure 13:
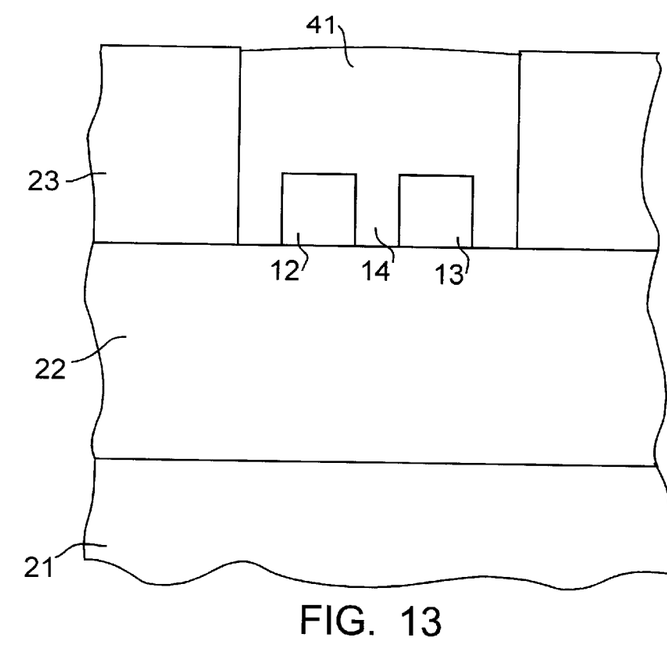

The upper cladding layer 23 is then deposited over and between the waveguides as shown in FIG. 9. This layer is typically BPTEOS (silica codoped with boron and phosphorus) having the same index as the lower cladding layer 21. The cladding layer is then masked with mask 37 as shown in FIG. 10. The mask opening 38 corresponds approximately with the width of the two waveguides 12, 13 and coupling section 14, and with the width of etch stop layer 36. Upper cladding layer 23 is then RIE etched through to the etch stop layer 36 as shown in FIG. 11. The etch stop layer 36 is removed, leaving the waveguides exposed as shown in FIG. 12. The opening 39 in cladding layer 23 over and between the waveguides 12 and 13 is then filled with the polymer according to the invention. The prepolymer may be applied by spinning, by syringe, or by suitable technique, and then cured to produce the polymer fill 41 as shown in FIG. 13.

A wide variety of polymers are useful as the localized cladding material according to the invention. Desired properties of the polymer include: low loss at wavelengths of interest (1.3–1.6 µm), adherent, thermally stable, hydrolytically stable, crack resistant, and an index in the range 1.3–1.6 µm. Preferred polymers are fluorinated polymers and silicon-based polymers (siloxanes). The former include partially or fully fluorinated polymers, such as copolymers of perfluoro-2,2-dimethyldioxole and tetrafluoroethylene sold under the tradename TEFLON AF® by DuPont; ring-cyclized homopolymers of perfluoro(allyl vinyl ether) sold under the tradename CYTOP® by Asahi Glass Co.; terpolymers of tetrafluoroethylene, hexafluoroethylene, and vinylidene fluoride sold under the tradename THV FLUOROPLASTIC® by 3M; copolymers of perfluoro-2,1-dimethyldioxole and chlorofluoroethylene; and terpolymers of perfluoro-2,2-dimethyldioxole, tetrafluoroethylene and chlorotrifluoroethylene. Suitable fluorinated polymers further comprise fluoroacrylates and/or their copolymers with hydrocarbon-based (non-fluorinated) acrylates (and/or methacrylates), fluorinated urethanes, fluorinated epoxies, fluorinated vinyl ethers, and fluorinated vinyl esters. Mixtures of any of these fluorinated polymers, copolymers or terpolymers may also be used. Fluoroacrylates comprise esters of acrylic add and predominantly fluorinated alcohols, diols, or polyols. Fluoromethacrylates comprise esters of methacrylic acid and predominantly fluorinated alcohols, diols, or polyols.

Suitable silicon based polymers include poly (dimethylsiloxane)s, poly(diphenylsiloxane)s, poly (methylphenylsiloxane)s, and copolymers of these. The silicon-based polymers further comprise poly(siloxane)s and poly(silsesquioxane)s having one or more pendant organic groups such as alkyl having 1–8 carbon atoms, or aryl or aralkyl combinations of alkyl (1–8 carbon atoms) and aromatic moieties containing acrylate. Copolymers or mixtures of any of these silicon-based polymers also may be used. Further descriptions and examples of suitable materials can be found in copending application Ser. No. 08/926,210 filed Sep. 9, 1997, incorporated herein by reference.

The polymers can be applied to the etched waveguide structure as a liquid or can be cast from solution. A preferred process is to fill the etched recess 38 in FIG. 12 with a liquid monomer or oligomer mixture, and cure the prepolymer in situ by baking or by UV radiation, depending on the curing mechanism. Filling the recess may be carried out in two steps to compensate for substantial shrinkage in each step. Adhesion promoters may also be included in the prepolymer mixture.

Figure 14:
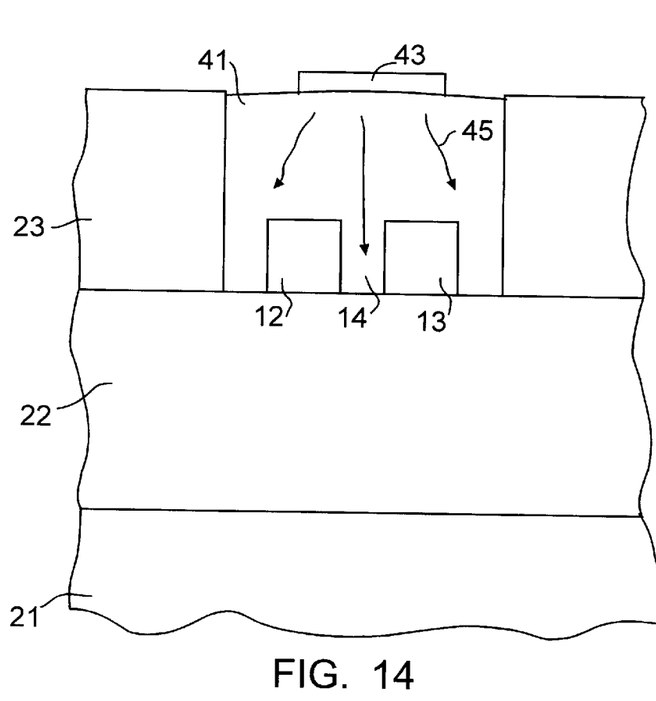

The heating element 43 is formed on the surface of the polymer fill 41 as shown in FIG. 14. The heating element can be a resistive strip of e.g. chrome or nickel chrome applied by evaporating or sputtering a layer of the resistive material and patterning the layer by a standard lift-off process. Gold electrode pads are provided at the ends of the strip heater also using a lift-off technique. Heat from element 43, represented by arrows 45, changes the refractive index of the polymer material in the coupling region 14 and thus changes the coupling ratio between waveguides 12 and 13.

Other approaches will occur to those skilled in the art for fabricating directional couplers according to the foregoing teachings. For example, if materials are found for the core and the cladding with sufficient etch selectivity between them, the etch stop layer can be omitted. Another alternative is to utilize the mask used to pattern the waveguides from the core layer as an etch stop layer, and carefully control the etch process to stop at or near the interface between the cladding layers. An overetch into the lower cladding layer, or a slight underetch, may be tolerated and still obtain the benefits of the invention.

An embodiment of the invention is presented for 5×5 µm waveguides, λ=1550 nm, a short coupling length of L=850

µm, a waveguide separation of 3 µm in the coupling region, and an upper cladding dn/dT=−4×10⁻⁴. A simplifying assumption is that the upper cladding material completely surrounds the waveguides in the coupling section instead of being restricted to 3 sides as it is in practice. The simulated results will provide insight into the design tradeoffs, but are expected to underestimate the temperature change needed due to this assumption. The device length is chosen so that, at its lowest operating temperature, 100% of the input light couples to the crossport. When the temperature is increased to its highest operating value, the cladding index decreases, the waveguides are more highly confined (larger Δ), and the coupling is reduced to its minimum value. The temperature change needed to induce a coupling change from 100% to 5% is calculated to be 80° C. The coupling ratios versus temperature change are shown in the following table, along with the effective Δ. The nominal temperature (ΔT=0) was chosen so that Δ=0.65%, a standard value.

TABLE I

| ΔT(° C.) | Δ(%) | κ |
|---|---|---|
| −10.0 | 0.37 | 100% |
| 0.0 | 0.65 | 94% |
| 10.0 | 0.92 | 71% |
| 20.0 | 1.20 | 46% |
| 30.0 | 1.47 | 28% |
| 40.0 | 1.75 | 17% |
| 50.0 | 2.02 | 11% |
| 60.0 | 2.30 | 8% |
| 70.0 | 2.57 | 5% |

A second example was simulated using a longer coupling length of L=1700 µm. The results are shown in Table II.

TABLE II

| T(° C.) | Δ(%) | κ |
|---|---|---|
| −10.0 | 0.37 | 0% |
| 0.0 | 0.65 | 23% |
| 10.0 | 0.92 | 82% |
| 20.0 | 1.20 | 99% |

In this case a 30° C. rise in temperature effects a change in coupling from 0% to 99%. For finer control of the coupling ratios, the shorter lengths are better. However, for a large coupling range, a longer coupling length is required to minimize the temperature change needed.

The waveguide structures in the devices described herein are conventional waveguides with a strip-like configuration and typically rectangular, or preferably essentially square, in cross section.

The heating element for heating the material in the coupling region is described as an electrical resistance heater but any suitable heating device such as a laser or other light source could be used.

It would appear that the most straightforward way of implementing the invention as described above is to deposit the polymer material so as to fill the gap created by etching the upper cladding. However, as an alternative, only the coupling region need be filled with polymer, and a cladding material deposited over the polymer material to essentially reconstitute the upper cladding layer over the coupler. Also the composition of the cladding material in this embodiment may be selected for more effective heat transfer to the buried polymer coupling region.

A variation on the approach just described is to apply the polymer to the coupling region prior to depositing the upper cladding layer. In this way the etch stop layer can be dispensed with, saving deposition, etch and lithographic steps.

In the embodiments described above a polymer material is suggested as the material with a high dependence of refractive index relative to the materials conventionally used for the upper cladding layer. However, other materials may be found that provide similar results. The essential requirement according to the invention is for the fill material in the coupling region to have a dn/dT=Y, and the upper cladding material having a dn/dT=X, where Y≧5X.

Polymer waveguides are relatively lossy in the 1550 nm region, typically in the 1 dB/cm range, compared to less than 0.1 dB/cm for glass waveguides. For the hybrid structures described here (glass core and lower cladding, polymer upper cladding), the loss in the hybrid region depends on the temperature (i.e. core confinement). For the nominal temperature where the polymer index matches the glass lower cladding, a loss of 0.3 dB/cm is estimated, decreasing to 0.16 dB/cm when the polymer upper cladding is heated by 50° C. (assuming the polymer dn/dT=−4×10⁻⁴). This calculation assumes that the loss scales linearly with the amount of power traveling in the glass versus polymer. The remainder of the device will enjoy the lower loss afforded by glass waveguides.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. An optical coupler comprising:
   a. a substrate,
   b. a lower cladding layer on the substrate,
   c. a first optical strip waveguide formed on said lower cladding layer for guiding a first lightwave in a path parallel to said lower cladding layer, said first optical waveguide having a coupling section along part of the strip waveguide,
   d. a second optical strip waveguide formed on said lower cladding layer for guiding a second lightwave in a path parallel to said lower cladding layer, said second optical waveguide having a coupling section parallel to the coupling section of said first waveguide, with a space between the coupling section of said first optical waveguide and the coupling section of said second optical waveguide, said space constituting a coupling region,
   e. an upper cladding layer covering said first and second optical strip waveguides and said lower cladding layer with a portion thereof filling said coupling region, said upper cladding layer comprising a material having a dependence of refractive index on temperature, dn/dT=X, and
   f. a heating device for heating said coupling region, the improvement comprising a material filling said coupling region that has a dependence of refractive index on temperature dn/dT of Y, where Y≧5X.

2. The optical coupler of claim 1 wherein the material filling the coupling region is a polymer.

3. The optical coupler of claim 1 wherein the upper and lower cladding layers comprise $SiO_2$.

4. The optical coupler of claim 3 wherein the first and second waveguides comprise doped $SiO_2$.

5. The optical coupler of claim 2 wherein said polymer has a dependence of refractive index with temperature dn/dT in the range −0.3×10⁻⁴/°C. to −5×10⁻⁴/°C.

6. The optical coupler of claim 4 in which the substrate is silicon.

7. A method for the manufacture of an optical coupler comprising the steps of:
   a. depositing a first cladding layer on a substrate,
   b. depositing a waveguide layer on said first cladding layer,
   c. applying a first lithographic mask on said waveguide layer,
   d. patterning said first lithographic mask with actinic radiation to leave portions of said waveguide layer exposed,
   e. etching away the exposed portions of said waveguide layer leaving at least two spaced apart waveguides on said first cladding layer, with a portion of each of said at least two spaced apart waveguides lying parallel and closely spaced to one another to define a coupling region therebetween,
   f. depositing an etch stop layer selectively on the coupling waveguide portions of said waveguides,
   g. depositing a second cladding layer over said waveguides and said coupling region, said second cladding material having a dependence of refractive index with temperature dn/dT of X,
   h. applying a second lithographic mask to said second cladding layer,
   i. patterning said second lithographic mask to leave the portion of said second cladding layer overlying said etch stop layer exposed,
   j. etching away said portion of said second cladding layer overlying said etch stop layer and the portion of the second cladding layer in the coupling region to expose said etch stop layer, and
   k. depositing a material in said coupling region that has a dependence of refractive index on temperature dn/dT of Y, where $Y \geq 5X$.

8. The method of claim 7 wherein the material deposited in the coupling region is a polymer.

9. The method of claim 7 including the additional step, after step j, of removing the etch stop layer.

10. The method of claim 7 including the additional step, after step k, of forming a heating element to heat said polymer material.

11. A method for the manufacture of an optical coupler comprising the steps of:
    a. depositing a first cladding layer on a substrate,
    b. depositing a waveguide layer on said first cladding layer,
    c. applying a first lithographic mask on said waveguide layer,
    d. patterning said first lithographic mask with actinic radiation to leave portions of said waveguide layer exposed,
    e. etching away the exposed portions of said waveguide layer leaving at least two spaced apart waveguides on said first cladding layer, with a portion of each of said at least two spaced apart waveguides lying parallel and closely spaced to one another to define a coupling region therebetween,
    f. depositing a material with a dependence of refractive index with temperature dn/dT of Y in said coupling region,
    g. depositing a second cladding layer over said waveguides and said coupling region, said second cladding material having a dependence of refractive index with temperature dn/dT of X, where $Y \geq 5X$.

12. The method of claim 11 wherein the material deposited in step f.

* * * * *